United States Patent [19]

Mena

[11] 4,150,813
[45] Apr. 24, 1979

[54] JACK SYSTEM FOR VEHICLE

[76] Inventor: Amado Mena, 1850 SW. 30 Ave., Miami, Fla. 33145

[21] Appl. No.: 827,711

[22] Filed: Aug. 25, 1977

[51] Int. Cl.² ............................................. B66F 7/04
[52] U.S. Cl. ................................................ 254/86 H
[58] Field of Search ............. 254/86 R, 86 H, DIG. 1

[56] References Cited

U.S. PATENT DOCUMENTS

| | | | |
|---|---|---|---|
| 2,683,277 | 7/1954 | Bernaerts | 254/DIG. 1 |
| 2,919,106 | 12/1959 | Le Mieux et al. | 254/86 H |
| 3,166,298 | 1/1965 | DiStefano | 254/86 H |

FOREIGN PATENT DOCUMENTS 368478  3/1932  United Kingdom .................. 254/86 R

*Primary Examiner*—Robert C. Watson

[57] ABSTRACT

A jack system for a land vehicle which includes a plurality of spaced jacks mounted to the vehicle and a hydraulic line connecting pistons included in the jacks to a pump so that, when through a control valve structure, fluid under pressure is delivered by the pump to the jacks, a portion will extend and engage the ground raising the vehicle; and reversal of the pump will lower the vehicle to the ground.

1 Claim, 4 Drawing Figures

JACK SYSTEM FOR VEHICLE

BACKGROUND OF THE INVENTION

In the past there have been numerous efforts to provide vehicles which include lifting structure so that the vehicle may be repaired. Jacks or lifting devices are old in the art. A representative prior art patent is that of U.S. Pat. No. 1,168,906, which is a screw-type jack, see FIG. 3. Lifting devices have been installed on vehicles, such as the air spring lift device of U.S. Pat. No. 3,064,994. Additionally, various types of jacks or lift devices have been installed on vehicles which are turned in one fashion or another from a horizontal attitude into a vertical attitude and then extended for the purpose of lifting the vehicle, see, for example, U.S. Pat. Nos. 2,233,732; 2,237,167; 2,442,881; and 3,288,436; these may be referred to as the tilt and lift type. Also included in this type of device is U.S. Pat. No. 3,860,216 which includes an arm and elbow type relationship for the tilt and swing action. Finally, U.S. Pat. No. 2,162,931, is for a lifting jack of a pneumatic type which is mounted to the wheel zone and which extends vertically. This invention is of a hydraulically operated lifting jack which is mounted to a vehicle and which includes a straight line action of extension or retraction. It differs from that of U.S. Pat. No. 2,162,931 in that it is hydraulically operated as opposed to pneumatically and includes a two-way valve, one which causes the piston to extend and the other to cause the piston to retract. The positive two-way action is not present in U.S. Pat. No. 2,162,931 which is pneumatically driven as opposed to hydraulically driven.

OBJECTS OF THE INVENTION

It is, accordingly, an object of this invention to provide an improved lift to be secured at a suitable location on a vehicle, preferably at the front or the rear, and which is actuated by hydraulic pressure to extend a piston and foot vertically to engage the ground and, hence, to lift the vehicle so that a tire may be repaired, for example. The retraction of the lifting device is accomplished by reversing the fluid flow to the hydraulic piston which causes the lifting device to retract, hence, providing a positive two-way action which is easy to operate and which stores the device, when not in use, in an out-of-the-way position for safe operation of the vehicle.

DESCRIPTION OF THE PREFERRED EMBODIMENT

Figure 2:
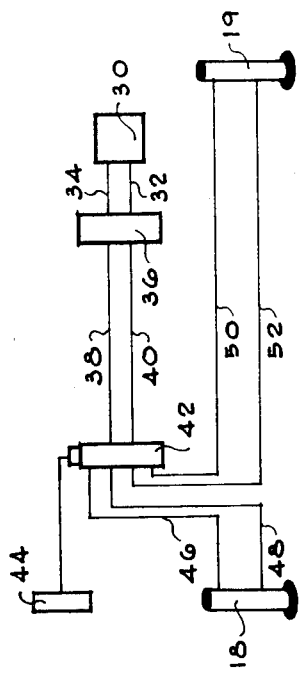
FIG. 2 is a schematic diagram of a hydraulic system suitable for use in the instant invention.
Figure 1:
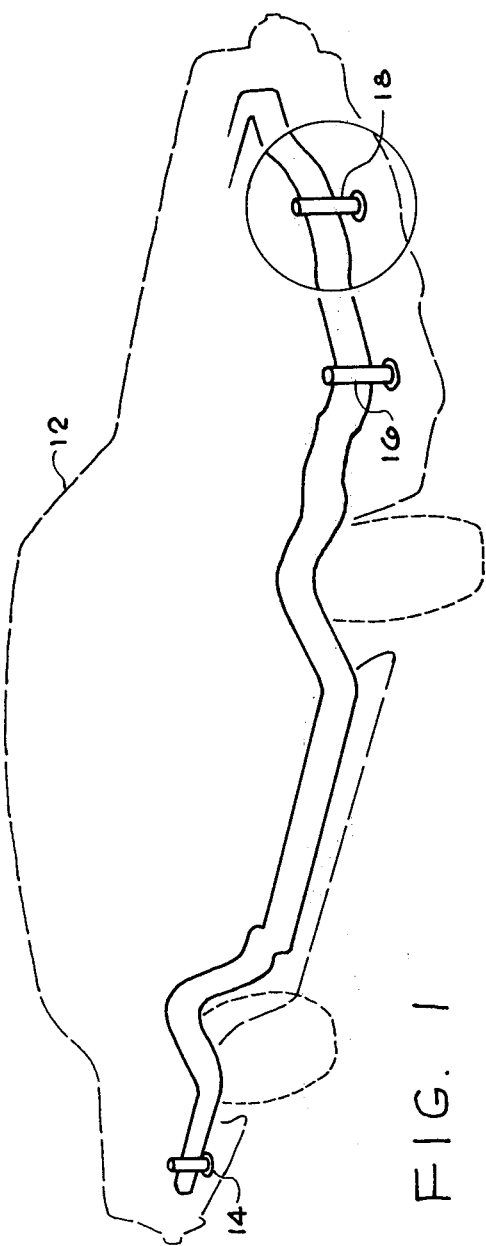
FIG. 1 is a perspective view in chain-dot lines of a land vehicle which is provided with the hydraulic jacks of the instant invention.

Numeral 12 is utilized in the instant drawings to designate a vehicle generally; and the vehicle may be equipped with jacks adjacent the front and rear wheels as indicated by the numerals 14 and 16 in one embodiment and, in another embodiment, there may be provided a centrally arranged jack such as 18 in the central zone of the front of the vehicle and a similar jack 19 in the central zone of the rear of the vehicle, the latter jack not being shown in FIG. 1; but it is represented in FIG. 2.

Figure 3:
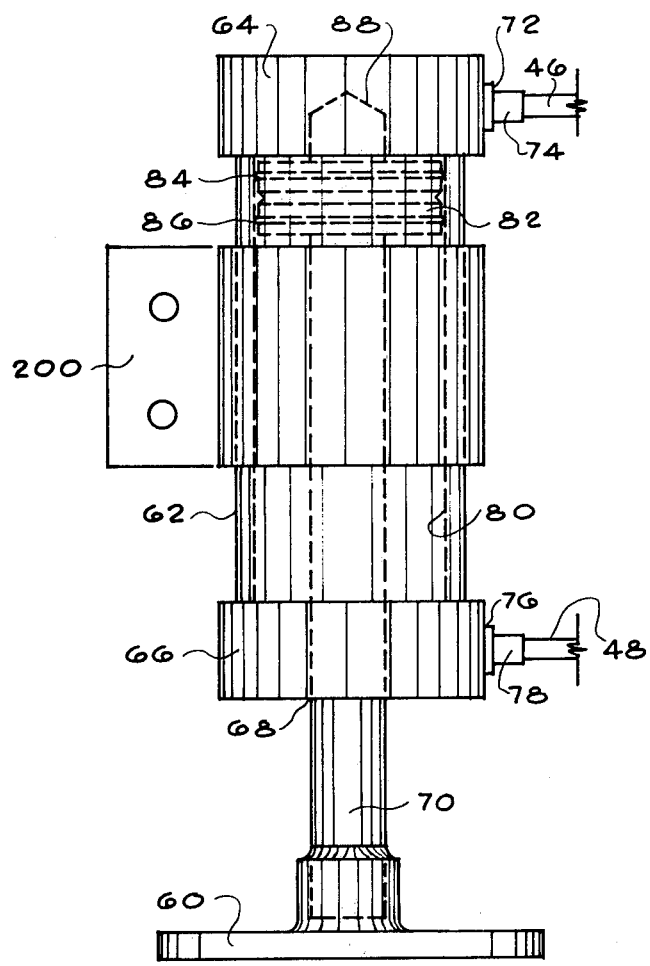
FIG. 3 is a view in side elevation illustrating the piston and jack combination in a first alternative.

Referring to FIG. 2 there is shown a hydraulic system which is utilized for raising and lowering a foot of a jack, such as that designated by the numeral 60 in FIG. 3. With reference to FIG. 2, it is seen that the hydraulic system includes a reservoir 30 with lines 32 and 34 in communication with a pump means generally designated by the numeral 36 from which there are provided lines 38 and 40 in fluid communication with a valve manifold 42, to be described more fully hereinafter, and which is controlled by operators on a control panel 44. The pump means includes lines such as 46 and 48 which communicate respectively with opposite ends of a jack 18 and, additionally, with lines 50 and 52 which are in parallel with the aforesaid lines 46 and 48 and which are in communication with a jack 19.

With further reference to FIG. 2, the operation will now be described. At the control panel operator provided for one of the jacks, for example, jack 18, the button or operator is manipulated to open a four-way valve included in the valve manifold 42, the particular valve not being shown for purposes of brevity, since the same are standard in the field. When this is done, pump means 36 causes fluid from the reservoir 30 to pass through the valve and down line 46 to the jack 18 and to cause movement of the piston downwardly as fluid flow within the cylinder at the lower end flows from the cylinder to the line 48 and valve manifold 42, pump means 36 and returning to the reservoir 30. Similar operation is utilized with respect to jack means 19 with the exception that a different four-way valve is opened and the flow is the same wih the exception that it passes through lines 50 and 52.

Referring now to FIG. 3, there is shown a suitable jack means having the foot 60. This particular hydraulic jack includes a cylinder 62 and the cylinder is closed at the upper end 64 and the lower end 66 with the exception that the lower end has a central opening 68 to accommodate passage of a shaft 70 in a manner to be explained. It will be seen that the line 46 connects to the upper end of the cylinder through a port 72 provided with a means to connect as indicated by the numeral 74. At the lower end 66 of the cylinder the line 48 is connected to a port 76 through a means to connect as at 78. Within the cylinder there is a bore 80 and a piston head 82 is slidably captivated therein, the piston head 82 being provided with rings such as 84 and 86 which provide for sealing sliding engagement with the interior walls of the bore in a conventional manner. The piston head 82 is fixed by a suitable means, not shown, to the aforesaid shaft 70. In the embodiment illustrated, the shaft 70 is affixed to the piston head 82 so as to be axially movable therewith and, preferably, the upper end or cap 64 of the cylinder is provided with a recess as at 88 which is companionately sized and configured to receive the upper end of the piston shaft.

In operation, when fluid flow is caused through the line 46 it will enter through a passageway, not shown, but suitably arranged so as to exert a force on the upper side of the piston head 82, this force causes the piston to move downwardly carrying with it the shaft 70 and the foot 60 until it reaches the ground at which time continued movement will cause the automobile to raise upwardly removing the gravity forces on the springs of the vehicle and, ultimately, causing the tire to be lifted off of the ground level. Simultaneously with the fluid flow into the cylinder from the pump in the manner previously described, fluid flow on the foot side of the piston head will be caused to flow outwardly through the line 48 returning through the four-way valve means of the valve manifold 42 and pump 36 to the reservoir 30. In this manner, pressure will continue to be exerted so long as the pump is energized and the automobile tire may be repaired.

In a preferred embodiment, a jack of the type described above is provided adjacent each of the wheels of the vehicle as indicated by the numerals 14 and 16 in FIG. 1.

In the most preferred embodiment, that one in which the jack was described to be at the central zone of both the front and the rear of the vehicle, as designated at the front in FIG. 1 by the numeral 18 with the circle therearound, it is seen on reference to that figure that the front end of the vehicle will be raised in a manner similar to that described above with the exception that the force will be sufficient to raise the entire front end of the vehicle so that it, together with the rear wheels which remain on the ground and support the vehicle while either of the front tires may be removed and replaced with a spare tire.

Referring specifically to the pump means 36, there may be various types of pump means utilized. In the preferred embodiment, the pump means comprises the power steering pump means with the unit described above connected to it in fluid communication. Alternatively, a separate manual pump might be utilized depending upon the particular type of equipment that the vehicle carries.

Figure 4:
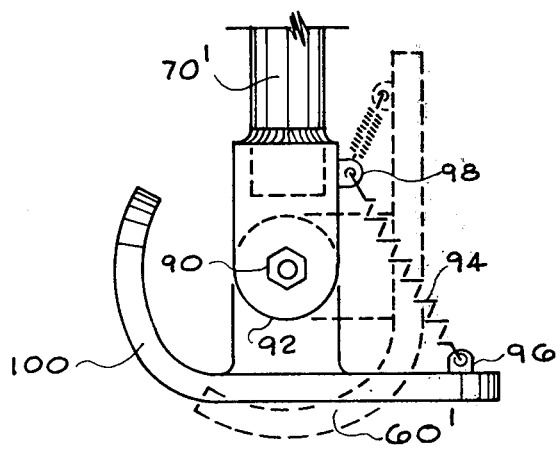
FIG. 4 is a view of an alternative embodiment of the piston and jack combination and illustrating the lower portion of it; in this view it is seen that the piston shaft is equipped with a somewhat modified foot.

Referring now to FIG. 4, there is an alternative embodiment shown which is somewhat modified with respect to the embodiment shown in FIG. 3 insofar as the lower or foot end of the hydraulic jack piston shaft is concerned. It will be seen that the foot 60' is rotatably mounted on the pivot means 90 in a suitable clevis type arrangement as indicated generally by the numeral 92. Normally, the foot is in the position indicated by the dotted lines with the spring 94 connecting the upper end 96 of the foot 60' by the spring 94 to an attachment means 98 on the lower end of the piston shaft. As the shaft 70' is extended it will been seen that the forces applied when the ground level is reached upon the lower end 100 of the foot, as it extends downwardly will cause the entire foot 60' to rotate into the position shown in FIG. 4 at which time the spring 94 will be extended under tension storing energy therein. When the piston is retracted by fluid flow in the reverse direction from the pump through the valve control means and line 48, the piston will be retracted and, when the forces are relaxed, the energy stored in the spring 94 will cause the foot 60' to rotate into the dotted line position shown in FIG. 4.

It will be understood that in the operation wherein the pump means comprises the power steering pump of the vehicle, or other fluid pump on the vehicle, the ignition should be on and the engine running so that the pump is energized which in effect utilizes the power supply of the vehicle for energizing and operating the pump continuously while the vehicle is being raised or lowered.

With respect to the four-way valves, one of which is included in the valve manifold to operate each jack, there are suitable valves commercially available of this type. Each is characterized by a safety control means which senses when the pressure within the cylinder causing the piston to extend has reached the appropriate p.s.i. indicating that the piston has been extended to its full length at which time a seal is effected to close the incoming line 38 so that additional pressure is not exerted and shunting the flow to the return line 40. In this manner, pressure continues to be applied within the cylinder maintaining the foot and shaft in the extended position until such time as the reverse flow is caused through the line 40 through the port 76 to raise the piston following the closing of the shunt path and continuing until the piton has resumed the position shown in FIG. 3, at which time the safety control means senses the repositioning of the piston shaft within the cyliner and further hydraulic flow is shunted directly between the lines 38 and 40 instead of through the piston. Alternatively, well known limit switches may be utilized to be actuated by the piston heads at the upper and lower extremities of its movement in the cylinders.

What is claimed is:

1. In combination, a vehicle and a jack system to selectively raise and lower a selected portion of the vehicle, said vehicle including a power steering pump and said jack system comprising:

a first hydraulic jack and a second hydraulic jack, each of said jacks having a vertically oriented longitudinal centerline, and each jack including a fixed cylindrical portion and a movable piston portion, said cylindrical portion including a closed upper end and a closed lower end, said closed lower end having an axial opening and said piston portion including a vertically downwardly extending rod telescopically passing through said opening, and said cylindrical portion including an upper port and a lower port adjacent the closed upper and closed lower ends respectively; means to mount each of said jacks to the vehicle at spaced locations;

said rod having an outer terminal end comprising a foot to apply a lifting force to the vehicle when the rod is extended on movement of said piston, wherein said terminal end is pivotally mounted to said rod and spring means are provided to urge said terminal end into a predetermined position and yieldable upon vertically applied forces to rotate about said pivot; and a hydraulic system including a reservoir, said power steering pump and said pump including valve control means, and conduit means connecting the pump to the upper port and lower port of each jack and to the reservoir, said control means being effective to deliver fluid pressure to selectively raise or lower said foot;

said outer terminal end comprising a foot including an enlarged portion defining a peripheral skirt and means connecting the enlarged portion to the terminal end of said rod and said means to mount comprising a bracket means about said cylinder.

* * * * *